United States Patent
Xu et al.

(10) Patent No.: US 11,632,190 B2
(45) Date of Patent: Apr. 18, 2023

(54) METHOD, DEVICE AND SYSTEM OF DETERMINING TRANSMISSION PARAMETER OF DATA SHARED CHANNEL

(71) Applicant: ZTE CORPORATION, Guangdong (CN)

(72) Inventors: Jun Xu, Guangdong (CN); Bo Dai, Guangdong (CN); Zewei Chen, Guangdong (CN); Jin Xu, Guangdong (CN); Xiaomei Xu, Guangdong (CN); Huiying Fang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 171 days.

(21) Appl. No.: 17/152,017

(22) Filed: Jan. 19, 2021

(65) Prior Publication Data

US 2021/0143932 A1    May 13, 2021

Related U.S. Application Data

(63) Continuation of application No. 16/075,582, filed as application No. PCT/CN2017/072275 on Jan. 23, 2017, now Pat. No. 10,938,508.

(30) Foreign Application Priority Data

Feb. 5, 2016   (CN) .......................... 201610082208.1

(51) Int. Cl.
*H04L 1/00*    (2006.01)
*H04W 4/80*    (2018.01)
(Continued)

(52) U.S. Cl.
CPC .......... *H04L 1/0025* (2013.01); *H04L 1/0003* (2013.01); *H04L 1/0007* (2013.01);
(Continued)

(58) Field of Classification Search
CPC ................. H04L 1/0007; H04L 1/1819; H04L 27/0008; H04L 27/36; H04L 1/1812; H04W 4/80; H04W 72/042
See application file for complete search history.

(56) References Cited

U.S. PATENT DOCUMENTS 8,532,206 B2    9/2013   Shin
2013/0308504 A1  11/2013  Nimbalker et al.
(Continued)

FOREIGN PATENT DOCUMENTS

CN    1535041 A    10/2004
CN    101453307 A   6/2009
(Continued)

OTHER PUBLICATIONS

China Patent Office, First Office Action dated Jan. 22, 2020 for application No. CN201610082208.1.
(Continued)

*Primary Examiner* — Charles C Jiang
*Assistant Examiner* — Shawn D Miller
(74) *Attorney, Agent, or Firm* — Li & Cai Intellectual Property (USA) Office

(57) ABSTRACT

A method, a device and a system of determining a transmission parameter of a data shared channel are provided. The method includes: receiving downlink control information including a field configured to determine a transmission parameter of a data shared channel; and determining the transmission parameter according to the field.

20 Claims, 2 Drawing Sheets

Receiving downlink control information, wherein the downlink control information includes a field configured to indicate a transmission parameter of a data shared channel — S102

Determining the transmission parameter according to the field — S104

(51) Int. Cl.
  *H04L 1/18* (2023.01)
  *H04L 27/00* (2006.01)
  *H04L 27/36* (2006.01)
  *H04W 72/04* (2023.01)
  *H04L 1/1812* (2023.01)
(52) U.S. Cl.
  CPC ........ *H04L 1/1819* (2013.01); *H04L 27/0008* (2013.01); *H04L 27/36* (2013.01); *H04W 4/80* (2018.02); *H04W 72/042* (2013.01)

(56) References Cited

U.S. PATENT DOCUMENTS

| | | | |
|---|---|---|---|
| 2014/0169297 A1 | 6/2014 | Kim et al. | |
| 2014/0293881 A1* | 10/2014 | Khoshnevis | H04L 5/0094 370/329 |
| 2015/0319776 A1 | 11/2015 | Seo et al. | |
| 2016/0112898 A1* | 4/2016 | Chen | H04W 28/0215 370/235 |
| 2017/0041948 A1* | 2/2017 | Cheng | H04L 5/0051 |
| 2018/0270008 A1* | 9/2018 | Yi | H04L 67/12 |
| 2018/0288750 A1* | 10/2018 | Yu | H04L 1/0003 |
| 2020/0128544 A1* | 4/2020 | Yano | H04L 27/00 |

FOREIGN PATENT DOCUMENTS

| | | |
|---|---|---|
| CN | 101834629 A | 9/2010 |
| CN | 103096379 A | 5/2013 |
| CN | 103687042 A | 3/2014 |
| CN | 104349491 A | 2/2015 |
| CN | 104885543 A | 9/2015 |
| EP | 2787670 A1 | 10/2014 |
| JP | 2015506645 A | 3/2015 |
| JP | 2015513848 A | 5/2015 |
| KR | 20150140283 A | 12/2015 |
| WO | 2015020587 A1 | 2/2015 |
| WO | 2015045865 A1 | 4/2015 |

OTHER PUBLICATIONS

Nokia Networks, DCI design for NB-IoT, 3GPP TSG-RAN WG1 NB-IoT Adhoc R1-160017, Jan. 20, 2016.
Korean Patent Office, First Office Action dated Jan. 9, 2020 for application No. KR10-2018-7024324.
Japan Patent Office, First Office Action dated Jun. 4, 2019 for application No. JP2018-541113.
Samsung, "R1-155508 Narrowband IoT—Discussion of Deployment Scenarios:", 3GPP TSG RAN WG1 Meeting #82bis, Oct. 31, 2015.
China Patent Office, Second Office Action dated Sep. 22, 2020 for application No. CN201610082208.1.
WIPO, International Search Report dated Apr. 17, 2017 for application No. PCT/CN2017/072275.
European Patent Office, Extended European Search Report dated Jan. 28, 2019 for application No. EP17746872.5.

* cited by examiner

METHOD, DEVICE AND SYSTEM OF DETERMINING TRANSMISSION PARAMETER OF DATA SHARED CHANNEL

CROSS REFERENCE

The present application is a continuation of U.S. patent application Ser. No. 16/075,582, filed on Aug. 3, 2018, which is based on International Application No. PCT/CN2017/072275, filed on Jan. 23, 2017, which claims priority to Chinese Patent Application No. 201610082208.1, filed on Feb. 5, 2016, the entire contents of these applications are incorporated herein by reference.

TECHNICAL FIELD

The present disclosure relates to the field of communication, and particularly to a method, a device and a system of determining a transmission parameter of a data shared channel.

BACKGROUND

In a wireless communication system, different users share a wireless communication resource by adopting a multi-access technology. Common multi-access technology includes frequency division multiplexing access (FDMA), time division multiplexing access (TDMA), code division multiplexing access (CDMA), orthogonal frequency division multiplexing access (OFDMA), single carrier-orthogonal frequency division multiplexing access (SC-OFDMA) and the like.

In the Release-12 version of long term evolution (LET) system, an uplink and a downlink respectively adopt SC-OFDMA technology and OFDMA technology. In the Release-13 version of LET system, narrow band-internet of things (NB-IOT) technology was proposed and began to be studied. An uplink transmission of the NB-IOT involves two types of multi-access technologies, that is, FMDA technology based on Gaussian filtered minimum shift keying (GMSK) modulation and SC-OFDMA technology. The FMDA technology based on GMSK modulation is advantageous in lower peak to average power ratio (PAPR), which facilitates improving the power amplifier efficiency, thereby limiting a cost of user equipment and ensuring the coverage thereof. Moreover, the FMDA technology based on GMSK modulation is also advantageous in less sensitivity to timing precision; and is disadvantage in poor spectral efficiency, while the SC-OFDAM has advantage of high spectral efficiency.

In an LTE-advanced (LTE-A) system, an uplink adopts single-carrier frequency-division multiple access (SC-FDMA) technology, while a downlink adopts orthogonal frequency-division multiple access (OFDMA) technology. The LTE and LTE-A system have become the $4^{th}$ generation wireless system, which is the most popular in the world.

In the LTE system, a base station sends downlink data to user equipment through a physical downlink shared channel (PDSCH), and the user equipment sends uplink data to the base station through a physical uplink shared channel (PUSCH). Control signaling required to be transmitted through the uplink includes acknowledgement/negative acknowledgement (ACK/NACK), as well as three forms reflecting channel state information (CSI) of downlink physical channel(s) which are channel quality indication (CQI), pre-coding matrix indicator (PMI) and rank indicator (RI), respectively. The user equipment (UE) reports the CSI to the base station through a physical uplink control channel (PUCCH) or a physical uplink shared channel (PUSCH).

The base station (BS) schedules according to the CSI to determine a size of resource transmitted by the downlink data, a location of frequency domain, a modulation and coding scheme, the number of layer(s) of multiple-input multiple-output (MIMO) spatial multiplexing and a pre-coding matrix, and to send downlink data and downlink control information (DCI) on N physical resource block(s) (PRB) which indicate(s) location(s) of frequency domain. Downlink control signaling carriers Imcs information. One piece of Imcs information, essentially, corresponds to one combination of modulation mode and coding mode, so that the UE can obtain a modulation and coding scheme of downlink data and can perform decoding and demodulating of PDSCH data according to the modulation and coding scheme as determined.

In the LTE system, a circular buffer (CB) based rate matching (RM), as a replacement of 3GPP Rel-6 rate matching algorithm, provides a method of simply generating a punctured pattern with good performance. A bit that is selected for transmission may be read out from any point of the CB; and when reaching an end of the CB, it may return to a starting position of the CB to continue reading the data, until L bit(s) has(have) been read out. Different positions in the CB may be designated as the starting position as read every time when transmitting a hybrid automatic repeat request (HARQ) data package. A definition of a redundancy version is just to determine a plurality of starting positions in the CB as read by the HARQ data package, and a value of the redundancy version just determines a starting position in the CB as read by a currently transmitted HARQ data package. In a 3GPP system, a HARQ process based on a CB-based RM defines four types of cyclic redundancy (RV) versions (RV=0, 1, 2, 3). A sub-package with a bit length of L that is retransmitted by the HARQ every time is consisted of L bit(s) which are selected, in a clockwise manner, from a starting point defined by the redundancy version.

Machine type communication (MTC) user equipment (UE), also referred to as machine to machine (M2M) UE, is a main application of internet of things (TOT) currently. In a technical report TR45.820V200 of the $3^{rd}$ generation partnership project (3GPP), several technologies applicable for cellular internet of Things (C-IOT) are published.

MTC usually requires for different coverage levels, and different coverage levels result in different large-scale fading. In order to remedy a performance loss due to the large-scale fading, a repetitive transmission is always the most effective measure. For a conventional repetitive transmission, firstly, a coded modulation has to be performed on the data according to a particular code rate r and a particular modulation order m, so as to obtain a modulation symbol sequence; then the modulation symbol sequence is mapped onto a particular time-frequency resource block. The repetitive transmission is to repeat the modulation symbol sequence for several times and then map the same onto different time-frequency resource blocks. A repetition number of such modulation symbol sequence is just a key parameter.

In order to satisfy the requirements of cellular internet of things (C-IoT), in the $69^{th}$ plenary session of the $3^{rd}$ generation partnership project (3GPP), it is proposed a new access system named narrowband-cellular internet of things (NB-IoT). The NB-IoT system pays attention to a radio frequency access technology with low complexity and small throughput capacity, with primary research objectives including: improved indoor coverage, supports from huge numbers of UEs with small throughput capacity, less sensitivity to time delay, ultra-low cost, small equipment power loss and network architecture. Both of uplink and downlink of the NB-IoT system have an emission bandwidth of 180 kHz, which is the same as a bandwidth of one physical resource block (PRB) of the LTE system; this facilitates reusing related designs of an existing LTE system in the NB-IoT system. Additionally, the NB-IoT system also supports three more types of operation modes including: i) a stand-alone operation, e.g., utilizing a frequency spectrum currently used by a GSM EDGE radio access network (GERAN) system to replace one or more GSM carrier wave; ii) a guard-band operation, e.g., utilizing a resource block, which is not used, within a guard-band range of LTE carrier wave; iii) an in-band operation, e.g., utilizing a resource block within a normal range of LTE carrier wave.

However, the LTE system and LTE-A system are different from the NB-IOT system in that, the bandwidth, the multi-access mode, the coding mode and the resource allocation of the LTE/LTE-A system have been considerably changed. For example, single-tone frequency multiple access and multi-tone frequency multiple access are introduced into the uplink, and a tail biting convolution code but not a Turbo code is utilized in the downlink, so that a method of determining a transmission parameter in the LTE system and the LTE-A system cannot be applied to the NB-IOT system, while the existing technology has not published any method of determining a transmission parameter of a data shared channel in the NB-IOT system yet; as a result, coding and decoding in the NB-IOT system cannot be properly achieved.

At present, it has not proposed any effective solution to solve the problem in the existing technology that the transmission parameter in the data shared channel of the NB-IOT system cannot be effectively determined, yet.

SUMMARY

The present disclosure provides a method, a device and a system of determining a transmission parameter of a data shared channel.

According to one aspect of the present disclosure, a method of determining a transmission parameter of a data shared channel is provided, including: receiving downlink control information, the downlink control information including a field configured to determine a transmission parameter of a data shared channel, the transmission parameter including at least one of a modulation mode, a transmission block size (TBS), a sequence length upon rate matching, a redundancy version and a repetition number, the field including at least one of a modulation and coding scheme (MCS) indicator field, a TBS indicator field, a resource allocation field and a repetition number indicator field, the MCS indicator field being configured to indicate a modulation and coding scheme, the TBS indicator field being configured to indicate a TBS, the resource allocation field being configured to indicate information of resource allocation of a transmission block (TB) based on a resource unit (RU), the repetition number indicator field being configured to indicate a number of repetitive transmission; and determining the transmission parameter according to the field.

Optionally, in the case where the field includes the TBS indicator field and the resource allocation field, determining the transmission parameter according to the field includes: determining the modulation mode according to the TBS indicator field and the resource allocation field.

Optionally, determining the modulation mode according to the TBS indicator field and the resource allocation field includes: determining the modulation mode according to the TBS indicator field, the resource allocation field, a multi-access mode and an uplink and downlink mode.

Optionally, determining the modulation mode according to the TBS indicator field, the resource allocation field, a multi-access mode and a link direction mode between uplink and downlink includes: in the case of uplink, single-tone frequency multiple access, selecting the modulation mode from a first set of modulation mode according to the TBS indicator field and the resource allocation field, the first set of modulation mode including a pi/2 BPSK modulation mode and a pi/4 QPSK modulation mode; in the case of uplink, multi-tone frequency multiple access, selecting the modulation mode from a second set of modulation mode according to the TBS indicator field and the resource allocation field, the second set of modulation mode including at least one of a QPSK modulation mode, a TPSK modulation mode and a 8-BPSK modulation mode; in the case of downlink, OFDMA multiple access, selecting the modulation mode from a third set of modulation mode according to the TBS indicator field and the resource allocation field, the third set of modulation mode including at least one of a QPSK modulation mode and a 16QAM modulation mode.

Optionally, in the case where the field includes the TBS indicator field and the resource allocation field, determining the transmission parameter according to the field includes: determining the redundancy version or the repetition number according to the TBS indicator field and the resource allocation field.

Optionally, in the case where the field includes the MCS indicator field and the resource allocation field, determining the transmission parameter according to the field includes: determining at least one of the modulation mode and the TBS according to the MCS indicator field and the resource allocation field.

Optionally, determining at least one of the modulation mode and the TBS according to the MCS indicator field and the resource allocation field includes: determining at least one of the modulation mode and the TBS according to the MCS indicator field, the resource allocation field, a multi-access mode and an uplink and downlink mode.

Optionally, determining at least one of the modulation mode and the TBS according to the MCS indicator field, the resource allocation field, a multi-access mode and a link direction mode between uplink and downlink includes: in the case of uplink, single-tone frequency multiple access, selecting at least one of the modulation mode and the TBS from a third set of modulation mode according to the MCS indicator field and the resource allocation field, the third set of modulation mode including a pi/2 BPSK modulation mode and a pi/4 QPSK modulation mode; in the case of uplink, multi-tone frequency multiple access, selecting at least one of the modulation mode and the TBS from a fourth set of modulation mode according to the MCS indicator field and the resource allocation field, the fourth set of modulation mode including at least one of a QPSK modulation mode, a TPSK modulation mode and a 8-BPSK modulation mode; in the case of downlink, OFDMA multiple access, selecting at least one of the modulation mode and the TBS from a fifth set of modulation mode according to the MCS indicator field and the resource allocation field, the fifth set of modulation mode including at least one of a QPSK modulation mode and a 16QAM modulation mode.

Optionally, in the case where the field includes the MCS indicator field and the resource allocation field, determining the transmission parameter according to the field includes: determining the redundancy version or the repetition number according to at least one of the MCS indicator field and the resource allocation field.

Optionally, the redundancy version is one element from a set {0, 1} or one element from a set {0, 1, 2, 3}.

Optionally, determining the transmission parameter according to the field includes: determining the TBS according to the field and a preset TBS table.

Optionally, the preset TBS table includes a one-dimensional table or a two-dimensional table, in the case where the preset TBS table is a one-dimensional table, a row index or a column index of the one-dimensional table is corresponding to one TBS index, and each TBS is corresponding to one TBS index; in the case where the preset TBS table is a two-dimensional table, each row of the two-dimensional table is corresponding to one TBS index, each column of the two-dimensional table is corresponding to a number of resource elements, and each TBS is corresponding to one TBS index and a number of resource elements.

Optionally, before determining the TBS according to the field and a preset TBS table, the method further includes determining the preset TBS table by the following way(s): using a first TBS table as the preset TBS table under a first condition, and using a second TBS table as the preset TBS table under a second condition, the first TBS table and the second TBS table being different TBS tables, the first condition and the second condition including at least one of: the first condition is uplink, single-tone frequency multiple access, while the second condition is uplink, multi-tone frequency multiple access; the first condition is uplink, single-tone frequency multiple access, while the second condition is downlink, OFDMA multiple access; the first condition is a first coverage level, while the second condition is a second coverage level, and the first coverage level is different from the second coverage level; the first condition is an in-band operation mode, while the second condition is a stand-alone operation mode or a guard-band operation mode; the first condition is uplink, multi-tone frequency multiple access, while the second condition is downlink, OFDMA multiple access; the first condition is single-tone frequency multiple access with a bandwidth of 3.75 KHz, while the second condition is single-tone frequency multiple access with a bandwidth of 15 KHz; the first condition is an enhanced mobile bandwidth (eMBB) scenario of the fifth generation wireless system (5G), while the second condition is an ultra-reliable low latency communication (URLLC) scenario of 5G or a massive machine type communication (mMTC) scenario of 5G; the first condition is a first protocol version, while the second condition is a second protocol version; the first condition is a first user capability, while the second condition is a second user capability; the first condition is a first transmission, while the second condition is a repetitive transmission; the first condition is a first downlink control information format, while the second condition is a second downlink control information format.

Optionally, the first TBS table and the second TBS table being different TBS tables includes at least one of the following cases: a set of TBS index supported by the first TBS table is the same as a set of TBS index supported by the second TBS table, and a set of RU numbers supported by the first TBS table is different from a set of RU numbers supported by the second TBS table; a set of TBS index supported by the first TBS table is different from a set of TBS index supported by the second TBS table, and a set of RU numbers supported by the first TBS table is the same as a set of RU numbers supported by the second TBS table; a set of TBS index supported by the first TBS table is different from a set of TBS index supported by the second TBS table, and a set of RU numbers supported by the first TBS table is also different from a set of RU numbers supported by the second TBS table; at a same row and column location, all TBS supported by the first TBS table and all TBS supported by the second TBS table satisfy a preset proportional relation; all TBS supported by the first TBS table is a subset of all TBS supported by the second TBS table.

Optionally, a set of RU numbers supported by the first TBS table being different from a set of RU numbers supported by the second TBS table includes at least one of the following cases: a set of RU numbers of the first TBS table is a subset of a set of RU numbers of the second TBS table; for a same column, an RU numbers of the first TBS table is a multiple of an RU numbers of the second TBS table; a set of TBS index supported by the first TBS table being different from a set of TBS index supported by the second TBS table includes: a set of TBS index supported by the first TBS table is a subset of a set of TBS index supported by the second TBS table; at a same row and column location, all TBS supported by the first TBS table and all TBS supported by the second TBS table satisfying a preset proportional relation includes: in the case where TBS1(i, j) is not null and TBS2(i, j) is not null, TBS2(i, j)/TBS1(i, j)=a+e, wherein 'a' is a real constant, 'e' is a real number smaller than or equal to a/10, 'e' denotes an error, 'I' indicates a row index, 'j' denotes a column index, 'TBS1(i, j)' denotes a TBS of a $i^{th}$ row and a $j^{th}$ column in the first TBS table, 'TBS2(i, j)' denotes a TBS of a $i^{th}$ row and $j^{th}$ column in the second TBS table.

Optionally, in the case where the field includes the resource allocation field and the repetition number indicator field, determining the transmission parameter according to the field includes: determining the sequence length upon rate matching according to the resource allocation field and at least one of the repetition number indicator field and a coverage level mode.

Optionally, determining the sequence length upon rate matching according to the resource allocation field and at least one of the repetition number indicator field and a coverage level mode includes at least one of the following cases: determining the sequence length upon rate matching according to a modulation order, a number of resource elements occupied by one TB and the repetition number Nr; determining the sequence length upon rate matching according to a modulation order, a number of resource elements occupied by one TB and a factor Nr1 of the repetition number, wherein the repetition number Nr=Nr1×Nr2, Nr1 and Nr2 each are an integer greater than or equal to 2.

Optionally, determining the transmission parameter according to the field includes: determining the modulation mode according to the field and a preset TBS table.

Optionally, in the case where the field includes the resource allocation field, determining the modulation mode according to the field and a preset TBS table includes: determining a number $N_{RU}$ of physical resource blocks occupied by a current physical downlink shared channel (PDSCH) according to the resource allocation field; determining the TBS according to the preset TBS table; determining a spectral efficiency according to the $N_{RU}$ and the TBS; determining the modulation mode according to the spectral efficiency.

Optionally, determining a spectral efficiency according to the $N_{RU}$ and the TBS includes: calculating the spectral efficiency η according to the following formula:

$$\eta = \frac{TBS + X_{crc}}{N_{RU}},$$

wherein the '$X_{crc}$' is the number of bit of a cyclic redundancy check code (CRC) of a physical resource block occupied by a transmission of the current PDSCH.

Optionally, determining the modulation mode according to the spectral efficiency includes: determining whether the spectral efficiency satisfies a preset range; determining a modulation mode corresponding to the preset range as the modulation mode in the case where the spectral efficiency satisfies the preset range.

Optionally, determining a modulation mode corresponding to the preset range as the modulation mode in the case where the spectral efficiency satisfies the preset range includes: in the case where $\eta \leq \eta_0$, $Q_m=1$; in the case where $\eta \geq \eta_0$, $Q_m=2$, wherein the $\eta_0$ is a preset threshold of the spectral efficiency, and the $Q_m$ denotes a modulation order of retransmission.

Optionally, the RU is a time-frequency two-dimensional resource of successive, Nsc subcarrier(s) in the frequency domain and successive, Nsym basic time-domain symbol unit(s) in the time domain, each RU includes Nsc*Nsym resource element(s), the Nsc and the Nsym each are an integer greater than or equal to 1.

Optionally, in the case where the field includes the TBS indicator field, determining the transmission parameter according to the field includes: determining the TBS according to the TBS indicator field and the number of resource elements.

Optionally, in the case where the field includes the TBS indicator field, determining the transmission parameter according to the field includes: in the case of a first HARQ transmission, determining the TBS according a same TBS index in the TBS indicator field; in the case of a HARQ retransmission, determining a redundancy version or a modulation order of the HARQ retransmission according a same TBS index in the TBS indicator field.

Optionally, in the case where the field includes the MCS indicator field, determining the transmission parameter according to the field includes: in the case of a first HARQ transmission, determining a MCS level according a same MCS index in the MCS indicator field; in the case of a HARQ retransmission, determining a redundancy version or a modulation order of the HARQ retransmission according a same MCS index in the MCS indicator field.

According to another aspect of the present disclosure, a method of determining a transmission parameter of a data shared channel is provided, including: obtaining a field configured to determine a transmission parameter of a data shared channel, the transmission parameter including at least one of a modulation mode, a transmission block size (TBS), a sequence length upon rate matching, a redundancy version and a repetition number, the field including at least one of a modulation and coding scheme (MCS) indicator field, a TBS indicator field, a resource allocation field and a repetition number indicator field, the MCS indicator field being configured to indicate a modulation and coding scheme, the TBS indicator field being configured to indicate a TBS, the resource allocation field being configured to indicate information of resource allocation of a transmission block (TB) based on a resource unit (RU), the repetition number indicator field being configured to indicate a number of repetitive transmission; and transmitting downlink control information and determining the transmission parameter according to the field, the downlink control information including a field configured to determine a transmission parameter of a data shared channel.

According to further another aspect of the present disclosure, a device for determining a transmission parameter of a data shared channel is provided, including: a receiving module configured to receive downlink control information, the downlink control information including a field configured to determine a transmission parameter of a data shared channel, the transmission parameter including at least one of a modulation mode, a transmission block size (TBS), a sequence length upon rate matching, a redundancy version and a repetition number, the field including at least one of a modulation and coding scheme (MCS) indicator field, a TBS indicator field, a resource allocation field and a repetition number indicator field, the MCS indicator field being configured to indicate a modulation and coding scheme, the TBS indicator field being configured to indicate a TBS, the resource allocation field being configured to indicate information of resource allocation of a transmission block (TB) based on a resource unit (RU), the repetition number indicator field being configured to indicate a number of repetitive transmission; and a determining module configured to determine the transmission parameter according to the field.

According to yet another aspect of the present disclosure, a device for determining a transmission parameter of a data shared channel is provided, including: an obtaining module configured to obtain a field configured to determine a transmission parameter of a data shared channel, the transmission parameter including at least one of a modulation mode, a transmission block size (TBS), a sequence length upon rate matching, a redundancy version and a repetition number, the field including at least one of a modulation and coding scheme (MCS) indicator field, a TBS indicator field, a resource allocation field and a repetition number indicator field, the MCS indicator field being configured to indicate a modulation and coding scheme, the TBS indicator field being configured to indicate a TBS, the resource allocation field being configured to indicate information of resource allocation of a transmission block (TB) based on a resource unit (RU), the repetition number indicator field being configured to indicate a number of repetitive transmission; and a transmitting module configured to send downlink control information and to determine the transmission parameter according to the field, the downlink control information including a field configured to determine a transmission parameter of a data shared channel.

According to still another aspect of the present disclosure, a system of determining a transmission parameter of a data shared channel is provided, including: a base station configured to obtain a field configured to determine a transmission parameter of a data shared channel, send downlink control information, and determine the transmission parameter according to the field, the downlink control information including the field configured to determine a transmission parameter of a data shared channel, the transmission parameter including at least one of a modulation mode, a transmission block size (TBS), a sequence length upon rate matching, a redundancy version and a repetition number, the field including at least one of a modulation and coding scheme (MCS) indicator field, a TBS indicator field, a resource allocation field and a repetition number indicator field, the MCS indicator field being configured to indicate a modulation and coding scheme, the TBS indicator field being configured to indicate a TBS, the resource allocation field being configured to indicate information of resource allocation of a transmission block (TB) based on a resource unit (RU), the repetition number indicator field being configured to indicate a number of repetitive transmission; and a user equipment configured to receive the downlink control information and determine the transmission parameter according the field configured to determine a transmission parameter of a data shared channel in the downlink control information.

Another embodiment of the present disclosure provides a computer storage medium stored with executive instructions, the executive instructions are configured to execute one of the steps in the above-mentioned method embodiments or a combination thereof.

This section provides a summary of various implementations or examples of the technology described in the disclosure, and is not a comprehensive disclosure of the full scope or all features of the disclosed technology.

BRIEF DESCRIPTION OF THE DRAWINGS

The drawings described herein are provided for further understanding of the present disclosure and constitute a part of the present disclosure. Illustrative embodiments of the present disclosure and the description thereof are for the purpose of explaining the present disclosure but not for improperly limiting the present disclosure. In the drawing.

DETAILED DESCRIPTION

Hereinafter the present disclosure will be described in more details with reference to the drawings and in conjunction with the embodiments. The embodiment(s) of the present disclosure and feature(s) in the embodiment(s) may be combined with each other, if not conflicted with each other.

It should be understood that, terms "first", "second" and the like appeared in the specification and the above drawings of the present disclosure are used for distinguishing similar objects and are not necessary to describe particular sequence(s) or precedence order(s).

Figure 1:
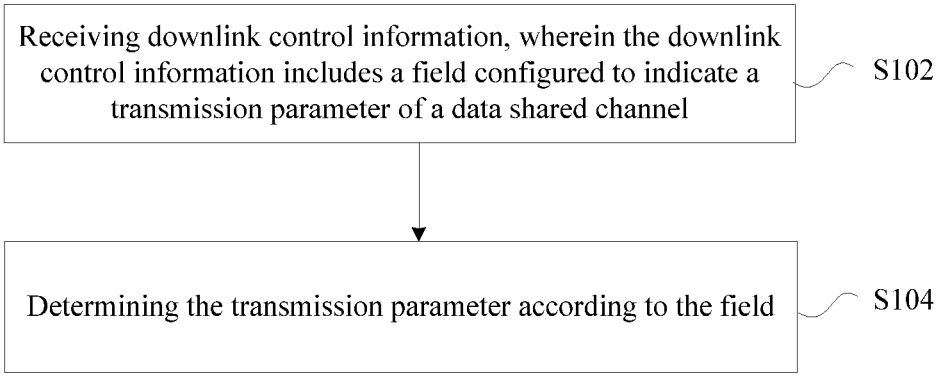
FIG. 1 is a flow chart of a method of determining a transmission parameter of a data shared channel according to an embodiment of the present disclosure.

The present embodiment provides a method of determining a transmission parameter of a data shared channel. FIG. 1 is a flow chart of a method of determining a transmission parameter of a data shared channel according to an embodiment of the present disclosure. As illustrated in FIG. 1, the flow chart includes steps as below.

In step S102, downlink control information is received. The downlink control information includes a field configured to indicate a transmission parameter of a data shared channel. The transmission parameter includes at least one of a modulation mode, a transmission block size (TBS), a sequence length upon rate matching, a redundancy version and a repetition number. The field includes at least one of a modulation and coding scheme (MCS) indicator field, a TBS indicator field, a resource allocation field and a repetition number indicator field. The MCS indicator field is configured to indicate a modulation and coding scheme, the TBS indicator field is configured to indicate a TBS, the resource allocation field is configured to indicate information of resource allocation of a transmission block (TB) based on a resource unit (RU); and the repetition number indicator field is configured to indicate the time of repetitive transmission.

In step S104, the transmission parameter is determined according to the field.

In this embodiment, an executive body of receiving the downlink control information may be user equipment (UE). The UE may determine the transmission parameter according to a field configured to indicate a transmission parameter of a data shared channel in the downlink control information. The modulation mode includes a modulation order.

The above-mentioned TBS indicator field is configured to directly determine one TBS, or configured to determine one TBS in conjunction with a number of resource element.

It should be noted that, the method of determining a transmission parameter of a data shared channel according to the embodiment of the present disclosure may be applied in a NB-IOT system so as to guarantee and support coding and encoding.

It should be noted that, the transmission parameter in the present disclosure includes but is not limited to the above-mentioned transmission parameters; and the field configured to indicate a transmission parameter in a data shared channel includes but is not limited to the above-mentioned fields.

With this embodiment, by receiving downlink control information including a field configured to indicate a transmission parameter of a data shared channel and by determining the transmission parameter according to the field, it may solve the problem in the related technology that the transmission parameter of the data shared channel in the NB-IOT system cannot be properly determined. This method effectively improves a performance of HARQ retransmission or repetitive transmission and reduces signaling overheads as far as possible, in the premise of maintaining compatibility.

Optionally, in the case where the field includes the TBS indicator field and the resource allocation field, determining the transmission parameter according to the field may include: determining the modulation mode according to the TBS indicator field and the resource allocation field.

Optionally, determining the modulation mode according to the TBS indicator field and the resource allocation field may include: determining the modulation mode according to the TBS indicator field, the resource allocation field, a multi-access mode and an uplink and downlink mode.

Optionally, determining the modulation mode according to the TBS indicator field, the resource allocation field, a multi-access mode and a link direction mode between uplink and downlink may include: in the case of uplink, single-tone frequency multiple access, selecting the modulation mode from a first set of modulation mode according to the TBS indicator field and the resource allocation field, the first set of modulation mode including a pi/2 BPSK modulation mode and a pi/4 QPSK modulation mode; in the case of uplink, multi-tone frequency multiple access, selecting the modulation mode from a second set of modulation mode according to the TBS indicator field and the resource allocation field, the second set of modulation mode including at least one of a QPSK modulation mode, a TPSK modulation mode and a 8-BPSK modulation mode; in the case of downlink, OFDMA multiple access, selecting the modulation mode from a third set of modulation mode according to the TBS indicator field and the resource allocation field, the third set of modulation mode including at least one of a QPSK modulation mode and a 16QAM modulation mode.

Particularly, in the case of uplink, single-tone frequency multiple access, one modulation mode may be selected from the first set of modulation mode according to the TBS indicator field and the resource allocation field, the first set of modulation mode including a pi/2 BPSK modulation mode and a pi/4 QPSK modulation mode. In the case of uplink, multi-tone frequency multiple access, one modulation mode may be selected from the second set of modulation mode according to the TBS indicator field and the resource allocation field, the second set of modulation mode including at least one of a QPSK modulation mode, a TPSK modulation mode and a 8-BPSK modulation mode. In the case of downlink, OFDMA multiple access, one modulation mode may be selected from the third set of modulation mode according to the TBS indicator field and the resource allocation field, the third set of modulation mode including at least one of a QPSK modulation mode and a 16QAM modulation mode.

For example, the UE receives downlink control information transmitted from the base station, and determines the modulation mode according to the resource allocation field, the TBS indicator, the multi-access mode, and the uplink and downlink mode. The TBS indicator field carries a TBS index, the TBS index uniquely and directly indicating a TBS. Table 1 is a TBS index table, in which the TBS indicator field carriers a TBS index of 3 bits, and the TBS index uniquely indicates one TBS value. Details are illustrated in Table 1 as below.

TABLE 1

| TB index | 0 | 1 | 2 | 3 | 4 | 5 | 6 | 7 |
|---|---|---|---|---|---|---|---|---|
| TBS | 16 | 56 | 136 | 224 | 336 | 488 | 616 | 936 |

The UE may determine the modulation mode according to the TBS index and a number $N_{RU}$ of RU occupied by one TB. In one exemplary embodiment, for single-tone frequency multiple access, the UE may determine a modulation order according to a table such as Table 2 (including corresponding relationships among the TBS index, the number of RUs and the modulation order), in which a modulation order of 1 denotes a modulation by adopting pi/2 BPSK, and a modulation order of 2 denotes a modulation by adopting pi/4 QPSK.

TABLE 2

| | $N_{ru}$ | | | | | |
|---|---|---|---|---|---|---|
| $I_{TBS}$ | 1 | 2 | 3 | 4 | 5 | 6 |
| 0 | 1 | 1 | 1 | 1 | 1 | 1 |
| 1 | 2 | 1 | 1 | 1 | 1 | 1 |
| 2 | 2 | 2 | 2 | 1 | 1 | 1 |
| 3 | 2 | 2 | 2 | 2 | 2 | 1 |
| 4 | 2 | 2 | 2 | 2 | 2 | 2 |
| 5 | 2 | 2 | 2 | 2 | 2 | 2 |
| 6 | 2 | 2 | 2 | 2 | 2 | 2 |
| 7 | 2 | 2 | 2 | 2 | 2 | 2 |

Optionally, in the case where the field includes the TBS indicator field and the resource allocation field, determining the transmission parameter according to the field may include: determining the redundancy version or the repetition number according to the TBS indicator field and the resource allocation field.

Optionally, in the case where the field includes the MCS indicator field and the resource allocation field, determining the transmission parameter according to the field may include: determining at least one of the modulation mode and the TBS according to the MCS indicator field and the resource allocation field.

Optionally, determining at least one of the modulation mode and the TBS according to the MCS indicator field and the resource allocation field may include: determining at least one of the modulation mode and the TBS according to the MCS indicator field, the resource allocation field, a multi-access mode and an uplink and downlink mode.

Optionally, determining at least one of the modulation mode and the TBS according to the MCS indicator field, the resource allocation field, a multi-access mode and a link direction mode between uplink and downlink may include: in the case of uplink, single-tone frequency multiple access, selecting at least one of the modulation mode and the TBS from a third set of modulation mode according to the MCS indicator field and the resource allocation field, the third set of modulation mode including a pi/2 BPSK modulation mode and a pi/4 QPSK modulation mode; in the case of uplink, multi-tone frequency multiple access, selecting at least one of the modulation mode and the TBS from a fourth set of modulation mode according to the MCS indicator field and the resource allocation field, the fourth set of modulation mode including at least one of a QPSK modulation mode, a TPSK modulation mode and a 8-BPSK modulation mode; in the case of downlink, OFDMA multiple access, selecting at least one of the modulation mode and the TBS from a fifth set of modulation mode according to the MCS indicator field and the resource allocation field, the fifth set of modulation mode including at least one of a QPSK modulation mode and a 16QAM modulation mode.

Particularly, in the case of uplink, single-tone frequency multiple access, selecting one modulation mode and a TBS from the third set of modulation mode according to the MCS indicator field and the resource allocation field, the third set of modulation mode including a pi/2 BPSK modulation mode and a pi/4 QPSK modulation mode; in the case of uplink, multi-tone frequency multiple access, selecting one modulation mode and a TBS from the fourth set of modulation mode according to the MCS indicator field and the resource allocation field, the fourth set of modulation mode including at least one of a QPSK modulation mode, a TPSK modulation mode and a 8-BPSK modulation mode; in the case of downlink, OFDMA multiple access, selecting one modulation mode and a TBS from the fifth set of modulation mode according to the MCS indicator field and the resource allocation field, the fifth set of modulation mode including at least one of a QPSK modulation mode and a 16QAM modulation mode.

Optionally, in the case where the field includes the MCS indicator field and the resource allocation field, determining the transmission parameter according to the field may include: determining the redundancy version or the repetition number according to at least one of the MCS indicator field and the resource allocation field.

Optionally, the redundancy version is one element from a set {0, 1} or one element from a set {0, 1, 2, 3}.

For example, for single-tone frequency multiple access, it may determine a current modulation order by looking up a table. When Qm=1, the pi/2 BPSK modulation mode is adopted; when Qm=2, the pi/4 QPSK modulation mode is adopted. Further, it may also obtain redundancy version information by looking up a table. Exemplary details are illustrated in Table 3.

TABLE 3

| Index of MCS IMCS | Modulation order Qm | Index of TBS ITBS | Redundancy version |
|---|---|---|---|
| 0(0) | 1 | 0 | 0 |
| 1(1) | 1 | 1 | 0 |
| 2(2) | 1 | 2 | 0 |
| 3(3) | 1 | 3 | 0 |
| 4(4) | 2 | 4 | 0 |
| 5(5) | 2 | 5 | 0 |
| 6(6) | 2 | 6 | 0 |
| 7(7) | 2 | 7 | 0 |
| 8(8) | 2 | 8 | 0 |
| 9(9) | 2 | 9 | 0 |
| 10(4) | 2 | 4 | 2 |
| 11(5) | 2 | 5 | 2 |
| 12(6) | 2 | 6 | 2 |
| 13(7) | 2 | 7 | 2 |
| 14(8) | 2 | 8 | 2 |
| 15(9) | 2 | 9 | 2 |

Optionally, determining the transmission parameter according to the field may include: determining the TBS according to the field and a preset TBS table.

The preset TBS table may be a one-dimensional table or a two-dimensional table. In the case where the preset TBS table is a one-dimensional table, a row index or a column index of the one-dimensional table is corresponding to one TBS index, and each TBS is corresponding to one TBS index. In the case where the preset TBS table is a two-dimensional table, each row of the two-dimensional table is corresponding to one TBS index, each column of the two-dimensional table is corresponding to a number of resource elements, and each TBS is corresponding to one TBS index and a number of resource elements.

For example, the TBS table is a two-dimensional table, a row index is corresponding to a TBS index, a column index is corresponding to an RU numbers, and each element in the table (corresponding to a certain row and a certain column) is one TBS.

It should be noted that, if the system supports only one modulation mode, then the TBS index may be a MCS index, and the row index of the TBS table is corresponding to the MCS index, which is also fallen within the protection scope of the present disclosure.

Optionally, before determining the TBS according to the field and a preset TBS table, the method may further include determining the preset TBS table by the following way: using a first TBS table as the preset TBS table under a first condition, and using a second TBS table as the preset TBS table under a second condition, the first TBS table and the second TBS table being different TBS tables. The first condition and the second condition may include at least one of: the first condition is uplink, single-tone frequency multiple access, while the second condition is uplink, multi-tone frequency multiple access; the first condition is uplink, single-tone frequency multiple access, while the second condition is downlink, OFDMA multiple access; the first condition is a first coverage level, while the second condition is a second coverage level; the first condition is an in-band operation mode, while the second condition is a stand-alone operation mode or a guard-band operation mode; the first condition is uplink, multi-tone frequency multiple access, while the second condition is downlink, OFDMA multiple access; the first condition is single-tone frequency multiple access with a bandwidth of 3.75 KHz, while the second condition is single-tone frequency multiple access with a bandwidth of 15 KHz; the first condition is an enhanced mobile bandwidth (eMBB) scenario of 5G, while the second condition is an ultra-reliable low latency communication (URLLC) scenario of 5G or a massive machine type communication (mMTC) scenario of 5G; the first condition is a first protocol version, while the second condition is a second protocol version; the first condition is a first user capability, while the second condition is a second user capability; the first condition is a first transmission, while the second condition is a repetitive transmission; the first condition is a first downlink control information format, while the second condition is a second downlink control information format. In the present embodiment, the first protocol version may be LTE version 12, and the second protocol version may be LTE version 13; the first transmission refers to a first transmission of a HARQ progress, and the repetitive transmission refers to a retransmission of a HARQ progress.

Optionally, the first TBS table and the second TBS table being different TBS tables includes at least one of the following cases: a set of TBS index supported by the first TBS table is the same as a set of TBS index supported by the second TBS table, and a set of RU numbers supported by the first TBS table is different from a set of RU numbers supported by the second TBS table; a set of TBS index supported by the first TBS table is different from a set of TBS index supported by the second TBS table, and a set of RU numbers supported by the first TBS table is the same as a set of RU numbers supported by the second TBS table; a set of TBS index supported by the first TBS table is different from a set of TBS index supported by the second TBS table, and a set of RU numbers supported by the first TBS table is also different from a set of RU numbers supported by the second TBS table; at a same row and column location, all TBS supported by the first TBS table and all TBS supported by the second TBS table satisfy a preset proportional relation; all TBS supported by the first TBS table is a subset of all TBS supported by the second TBS table.

Particularly, in the embodiment above, the following three aspects should be noted.

i) A set of RU numbers supported by the first TBS table being different from a set of RU numbers supported by the second TBS table may include at least one of the following cases: a set of RU numbers of the first TBS table is a subset of a set of RU numbers of the second TBS table, and for the same column, an RU numbers of the first TBS table is a multiple of an RU numbers of the second TBS table.

ii) A set of TBS index supported by the first TBS table being different from a set of TBS index supported by the second TBS table may include: a set of TBS index supported by the first TBS table is a subset of a set of TBS index supported by the second TBS table.

iii) At a same row and column location, all TBS supported by the first TBS table and all TBS supported by the second TBS table satisfying a preset proportional relation may include: in the case where TBS1(I, j) is not null and TBS2(i, j) is not null, TBS2(i, j)/TBS1(i, j)=a+e, wherein 'a' is a real constant, 'e' is a real number smaller than or equal to a/10, 'e' denotes an error, 'i' indicates a row index, 'j' denotes a column index, 'TBS1(i, j)' denotes a TBS of a $i^{th}$ row and a $j^{th}$ column in the first TBS table, 'TBS2(i, j)' denotes a TBS of a $i^{th}$ row and a $j^{th}$ column in the second TBS table.

For example, in the case where a set of TBS index supported by the first TBS table is the same as a set of TBS index supported by the second TBS table and a set of RU numbers of the first TBS table is a subset of a set of RU numbers of the second TBS table, the first TBS table is illustrated in Table 4 and the second TBS table is illustrated in Table 5.

TABLE 4

| $I_{TBS}$ | $N_{ru}$ | | | |
|---|---|---|---|---|
| | 1 | 2 | 3 | 4 |
| 0 | 16 | 32 | 56 | 88 |
| 1 | 24 | 56 | 88 | 144 |
| 2 | 32 | 72 | 144 | 176 |
| 3 | 40 | 104 | 176 | 208 |
| 4 | 56 | 120 | 208 | 256 |
| 5 | 72 | 144 | 224 | 328 |
| 6 | 88 | 176 | 256 | 392 |
| 7 | 104 | 224 | 328 | 472 |
| 8 | 120 | 256 | 392 | 536 |
| 9 | 136 | 296 | 456 | 616 |

TABLE 5

| $I_{TBS}$ | $N_{ru}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 88 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |

For example, in the case where a set of TBS index supported by the first TBS table is the same as a set of TBS index supported by the second TBS table and an RU numbers of the first TBS table is a multiple of an RU numbers of the second TBS table given a same column, the first TBS table is illustrated in Table 6 and the second TBS table is illustrated in Table 7.

TABLE 6

| $I_{TBS}$ | $N_{ru}$ | | | |
|---|---|---|---|---|
| | 1 | 2 | 3 | 4 |
| 0 | 16 | 32 | 56 | 88 |
| 1 | 24 | 56 | 88 | 144 |
| 2 | 32 | 72 | 144 | 176 |
| 3 | 40 | 104 | 176 | 208 |
| 4 | 56 | 120 | 208 | 256 |
| 5 | 72 | 144 | 224 | 328 |
| 6 | 88 | 176 | 256 | 392 |
| 7 | 104 | 224 | 328 | 472 |
| 8 | 120 | 256 | 392 | 536 |
| 9 | 136 | 296 | 456 | 616 |

TABLE 7

| $I_{TBS}$ | $N_{ru}$ | | | |
|---|---|---|---|---|
| | 2 | 4 | 6 | 8 |
| 0 | 16 | 32 | 56 | 88 |
| 1 | 24 | 56 | 88 | 144 |
| 2 | 32 | 72 | 144 | 176 |

TABLE 7-continued

| $I_{TBS}$ | $N_{ru}$ | | | |
|---|---|---|---|---|
| | 2 | 4 | 6 | 8 |
| 3 | 40 | 104 | 176 | 208 |
| 4 | 56 | 120 | 208 | 256 |
| 5 | 72 | 144 | 224 | 328 |
| 6 | 88 | 176 | 256 | 392 |
| 7 | 104 | 224 | 328 | 472 |
| 8 | 120 | 256 | 392 | 536 |
| 9 | 136 | 296 | 456 | 616 |

For example, in the case where a set of TBS index supported by the first TBS table is a subset of a set of TBS index supported by the second TBS table and a set of RU numbers supported by the first TBS table is the same as a set of RU numbers supported by the second TBS table, the first TBS table is illustrated in Table 8, and the second TBS table is illustrated in Table 9.

TABLE 8

| $I_{TBS}$ | $N_{ru}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 88 | 176 | 256 | 392 | 504 | 600 |
| 7 | 104 | 224 | 328 | 472 | 584 | 712 |

TABLE 9

| $I_{TBS}$ | $N_{ru}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 88 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |

For example, in the case where a set of TBS index supported by the first TBS table is a subset of a set of TBS index supported by the second TBS table and a set of RU numbers of the first TBS table is a subset of a set of RU numbers of the second TBS table, the first TBS table is illustrated in Table 10 and the second TBS table is illustrated in Table 11.

TABLE 10

| $I_{TBS}$ | $N_{ru}$ | | | |
|---|---|---|---|---|
| | 1 | 2 | 3 | 4 |
| 0 | 16 | 32 | 56 | 88 |
| 1 | 24 | 56 | 88 | 144 |
| 2 | 32 | 72 | 144 | 176 |
| 3 | 40 | 104 | 176 | 208 |
| 4 | 56 | 120 | 208 | 256 |

TABLE 10-continued

| $I_{TBS}$ | $N_{ru}$ | | | |
|---|---|---|---|---|
| | 1 | 2 | 3 | 4 |
| 5 | 72 | 144 | 224 | 328 |
| 6 | 88 | 176 | 256 | 392 |
| 7 | 104 | 224 | 328 | 472 |

TABLE 11

| $I_{TBS}$ | $N_{ru}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 88 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |

For example, in the case where all TBS supported by the first TBS table and all TBS supported by the second TBS table, at a same row and column location, satisfying a preset proportional relation, the first TBS table is illustrated in Table 12 and the second TBS table is illustrated in Table 13.

TABLE 12

| $I_{TBS}$ | $N_{ru}$ | | | |
|---|---|---|---|---|
| | 1 | 2 | 3 | 4 |
| 0 | — | 21 | 37 | 59 |
| 1 | 16 | 37 | 59 | 96 |
| 2 | 21 | 48 | 96 | 117 |
| 3 | 27 | 69 | 117 | 139 |
| 4 | 37 | 80 | 139 | 171 |
| 5 | 48 | 96 | 149 | 219 |
| 6 | 59 | 117 | 171 | 261 |
| 7 | 69 | 149 | 219 | 315 |

TABLE 13

| $I_{TBS}$ | $N_{ru}$ | | | |
|---|---|---|---|---|
| | 1 | 2 | 3 | 4 |
| 0 | 16 | 32 | 56 | 88 |
| 1 | 24 | 56 | 88 | 144 |
| 2 | 32 | 72 | 144 | 176 |
| 3 | 40 | 104 | 176 | 208 |
| 4 | 56 | 120 | 208 | 256 |
| 5 | 72 | 144 | 224 | 328 |
| 6 | 88 | 176 | 256 | 392 |
| 7 | 104 | 224 | 328 | 472 |

For example, in the case where a set of TBS index supported by the first TBS table is a subset of a set of TBS index supported by the second TBS table, the TBS supported by the first TBS table may include: 16, 24, 32, 40, 56, 72, 88, 104, 120, 144, 176, 208, 256; the TBS supported by the second TBS table includes: 16, 24, 32, 40, 56, 72, 88, 104, 120, 144, 176, 208, 224, 256, 328, 392, 472. The TBS that is possibly supported by the first TBS table is a subset of the second TBS table.

Optionally, in the case where the field includes the resource allocation field and the repetition number indicator field, determining the transmission parameter according to the field includes: determining the sequence length upon rate matching according to the resource allocation field and at least one of the repetition number indicator field and a coverage level mode.

Optionally, determining the sequence length upon rate matching according to the resource allocation field and at least one of the repetition number indicator field and a coverage level mode includes at least one of the following cases: determining the sequence length upon rate matching according to a modulation order, a number of resource elements occupied by one transmission block and the repetition number Nr; determining the sequence length upon rate matching according to a modulation order, a number of resource elements occupied by one transmission block and a factor Nr1 of the repetition number, wherein the repetition number Nr=Nr1×Nr2, Nr1 and Nr2 each are an integer greater than or equal to 2.

For a conventional, repetitive transmission, firstly, a coded modulation has to be performed on the data according to a particular code rate r and a particular modulation order m, so as to obtain a modulation symbol sequence; then the modulation symbol sequence is mapped onto a particular time-frequency resource block. A repetitive transmission is to repeat the modulation symbol sequence for several times and then map the same onto different time-frequency resource blocks. As a result, the sequence length upon rate matching has nothing to do with the repetition number. The present disclosure proposes incorporating the repetitive transmission into the process of rate matching, so as to affect the mode of the coded modulation; in this way, a code rate can be reduced. If a maximum working code rate permitted by a coded modulation module is greater than ⅓, then introducing the repetition number into a rate matching module allows the code rate to be reduced, thereby improving the incremental redundancy merged with gain.

As an example, two optional ways are provided.

The first one is to determine the sequence length upon rate matching according to the modulation order, the number of resource elements occupied by one transmission block, and the repetition number Nr.

The second one is to determine the sequence length upon rate matching according to the modulation order, the number of resource elements occupied by one transmission block, and a factor Nr1 of the repetition number, wherein Nr=Nr1× Nr2, Nr1 and Nr2 each are an integer greater than or equal to 2.

In the optional embodiment, for the NB-IOT system, in the case where the redundancy version is not supported by the tail biting convolutional code (TBCC), the method can improve the performance of repetitive, incremental redundancy.

Optionally, determining the transmission parameter according to the field includes: determining the modulation mode according to the field and a preset TBS table.

Optionally, in the case where the field includes the resource allocation field, determining the modulation mode according to the field and a preset TBS table includes: determining the number $N_{RU}$ of physical resource blocks occupied by a current physical downlink shared channel (PDSCH) according to the resource allocation field; determining the TBS according to a preset TBS table; determining a spectral efficiency according to the $N_{RU}$ and the TBS; and determining the modulation mode according to the spectral efficiency.

Optionally, determining a spectral efficiency according to the $N_{RU}$ and the TBS includes: calculating the spectral efficiency η according to the following formula:

$$\eta = \frac{TBS + X_{crc}}{N_{RU}},$$

wherein $X_{crc}$ is the number of bit of a cyclic redundancy check code (CRC) of a physical resource block occupied by a current transmission through PDSCH.

Optionally, determining the modulation mode according to the spectral efficiency may include: determining whether the spectral efficiency satisfies a preset range; determining a modulation mode corresponding to the preset range as the modulation mode in the case where the spectral efficiency satisfies the preset range.

Optionally, determining a modulation mode corresponding to the preset range as the modulation mode in the case where the spectral efficiency satisfies the preset range includes: in the case where η≤η$_0$, $Q_m$=1; and in the case where η≥η$_0$, $Q_m$=2, wherein η$_0$ is a preset, spectral efficiency threshold (a threshold value associated with the spectral efficiency), and $Q_m$ denotes a modulation order of retransmission.

It should be noted that, similar method may be adopted for uplink, multi-tone frequency multi-access and downlink, OFDMA multiple access to determine a modulation mode of a current transmission block. Alternatively, the table(s) or formula(s) above may also be utilized to determine the redundancy version (RV) and the repetition number.

Optionally, the RU is a time-frequency two-dimensional resource of successive, Nsc subcarrier(s) in the frequency domain and successive, Nsym basic time-domain symbol unit(s) in the time domain, each RU includes Nsc*Nsym resource element(s), the Nsc and the Nsym are both integers greater than or equal to 1.

Optionally, in the case where the field includes the TBS indicator field, determining the transmission parameter according to the field includes: determining the TBS according to the TBS indicator field and the number of resource elements. That is to say, the TBS indicator field may be used for, in conjunction with the number of resource elements, determining the TBS.

Optionally, in the case where the field includes the TBS indicator field, determining the transmission parameter according to the field includes: in the case of a first HARQ transmission, determining the TBS according a same TBS index in the TBS indicator field; in the case of a HARQ retransmission, determining a redundancy version or a modulation order of the HARQ retransmission according a same TBS index in the TBS indicator field.

Optionally, in the case where the field includes the MCS indicator field, determining the transmission parameter according to the field includes: in the case of a first HARQ transmission, determining a MCS level according a same MCS index in the MCS indicator field; in the case of a HARQ retransmission, determining a redundancy version or a modulation order of the HARQ retransmission according a same MCS index in the MCS indicator field.

Optionally, after the step S104, the method may further include the following steps.

In step S106, a receiving process or a transmitting process of data is performed according to the transmission parameter as determined.

In the step S106, if it needs to perform the receiving process of the data, then the transmission parameter is utilized to perform the receiving process including demodulating, decoding, repeating and merging. In one exemplary embodiment, if the transmission parameter is a modulation mode (modulation order), then it's used for demodulating; if the transmission parameter is a TBS or a RV or a sequence length upon rate matching, then it's used for decoding; if the transmission parameter is a repetition number, then it's used for repeating a chase merging. If it needs to perform the transmitting process of the data, then the transmission parameter is utilized to perform the transmitting process including modulating, coding and repetitive transmission. In one exemplary embodiment, if the transmission parameter is a modulation mode (modulation order), then it's used for modulating; if the transmission parameter is a TBS or a RV or a sequence length upon rate matching, then it's used for coding; if the transmission parameter is a repetition number, then it's used for repeating the time domain.

Figure 2:
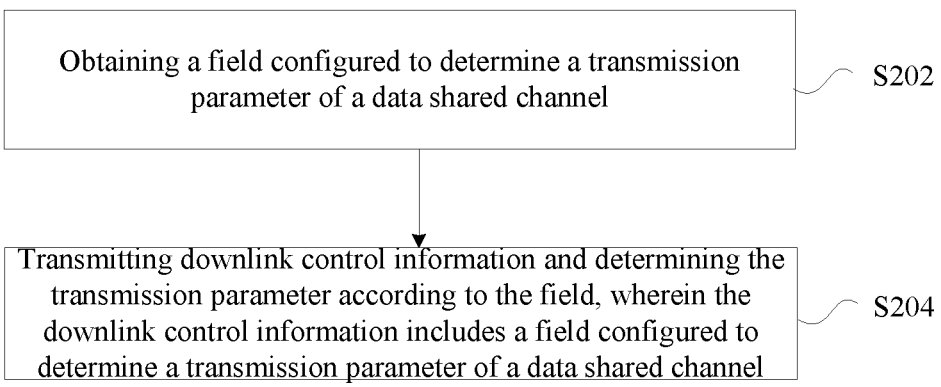
FIG. 2 is a flow chart of another method of determining a transmission parameter of a data shared channel according to an embodiment of the present disclosure.

Hereinafter, the embodiment of the present disclosure further provides another method of determining a transmission parameter of a data shared channel. As illustrated in FIG. 2, the method includes steps as below.

In step S202, a field configured to determine a transmission parameter of a data shared channel is obtained, the transmission parameter including at least one of a modulation mode, a transmission block size (TBS), a sequence length upon rate matching, a redundancy version and a repetition number; the field includes at least one of a modulation and coding scheme (MCS) indicator field, a TBS indicator field, a resource allocation field and a repetition number indicator field; the MCS indicator field is configured to indicate a modulation and coding scheme; the TBS indicator field is configured to indicate a TBS; the resource allocation field is configured to indicate information of resource allocation of a transmission block (TB) based on a resource unit (RU); the repetition number indicator field is configured to indicate the time of repetitive transmission.

In step S204, downlink control information is transmitted and the transmission parameter is determined according to the field, the downlink control information including a field configured to determine a transmission parameter of a data shared channel.

In the embodiment, the executive object of transmitting the downlink control information may be a base station.

In this embodiment, by determining a field configured to indicate a transmission parameter of a data shared channel and by transmitting downlink control information including the field configured to indicate the transmission parameter of the data shared channel, it solves the problem in the related technology that the transmission parameter of the data shared channel in the NB-IOT system cannot be effectively determined. This method effectively improves a performance of HARQ retransmission or repetitive transmission and reduces signaling overheads as far as possible, in the premise of maintaining compatibility.

Optionally, after step S204, the transmitting process or receiving process is performed according to the transmission parameter as determined.

From the description of embodiments above, those skilled in the art will be clearly appreciated that, the method according to the embodiments above may be implemented by software with the aid of necessary, general-purpose hardware platform, and may also be implemented by hardware, of course. Based on such understanding, the technical solution of the present disclosure or a part thereof contributing to the existing technology, essentially, may be implemented in a form of computer software product which is stored on a storage medium (e.g., ROM/RAM, magnetic disc and optical disc) and includes several instructions to cause a UE (e.g., a mobile phone, a computer, a server or a network device) to implement the method(s) described in respective embodiments of the present disclosure.

The present embodiment further provides a device for determining a transmission parameter of a data shared channel. The device is configured to implement the above-mentioned embodiment(s) and exemplary implementation(s), without repeating contents having been described. As used hereinafter, the term "module" may be a combination of software and/or hardware to achieve predetermined function(s). Although the device described in the following embodiment(s) is better implemented with software, implementation(s) with hardware or a combination of software and hardware is/are also possible and conceivable.

Figure 3:
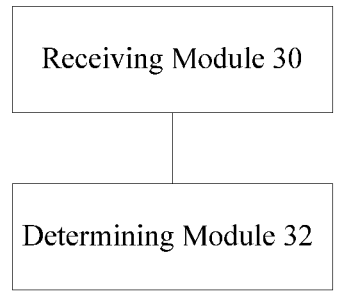
FIG. 3 is a block diagram of a device for determining a transmission parameter of a data shared channel according to an embodiment of the present disclosure.

As illustrated in FIG. 3, the device for determining a transmission parameter of a data shared channel according to the embodiment of the present disclosure includes a receiving module 30 and a determining module 32.

The receiving module 30 is configured to receive downlink control information, the downlink control information including a field configured to determine a transmission parameter of a data shared channel; the transmission parameter includes at least one of a modulation mode, a transmission block size (TBS), a sequence length upon rate matching, a redundancy version and a repetition number; the field includes at least one of a modulation and coding scheme (MCS) indicator field, a TBS indicator field, a resource allocation field and a repetition number indicator field; the MCS indicator field is configured to indicate a modulation and coding scheme; the TBS indicator field is configured to indicate a TBS; the resource allocation field is configured to indicate information of resource allocation of a transmission block (TB) based on a resource unit (RU); the repetition number indicator field is configured to indicate the time of repetitive transmission.

The determining module 32 is configured to determine the transmission parameter according to the field.

Optionally, the device may further include a data transmitting module or a data receiving module 34 which is configured to perform a receiving process or a transmitting process according to the transmission parameter as determined.

If the receiving module 34 is a data receiving module, then the transmission parameter is utilized to perform the receiving process including demodulating, decoding, repeating and merging. In one exemplary embodiment, if the transmission parameter is a modulation mode (modulation order), then it's used for demodulating; if the transmission parameter is a TBS or a RV or a sequence length upon rate matching, then it's used for decoding; if the transmission parameter is a repetition number, then it's used for repeating a chase merging. If the receiving module 34 is a data transmitting module, then the transmission parameter is utilized to perform the transmitting process including modulating, coding and repetitive transmission. In one exemplary embodiment, if the transmission parameter is a modulation mode (modulation order), then it's used for modulating; if the transmission parameter is a TBS or a RV or a sequence length upon rate matching, then it's used for coding; if the transmission parameter is a repetition number, then it's used for repeating a time domain.

With this embodiment, by receiving downlink control information including a field configured to indicate a transmission parameter of a data shared channel through the receiving module 30 and by determining the transmission parameter according to the field through the determining module 32, it solves the problem in the related technology that the transmission parameter of the data shared channel in the NB-IOT system cannot be effectively determined. This method effectively improves a performance of HARQ retransmission or repetitive transmission and reduces signaling overheads as far as possible, in the premise of maintaining compatibility.

Figure 4:
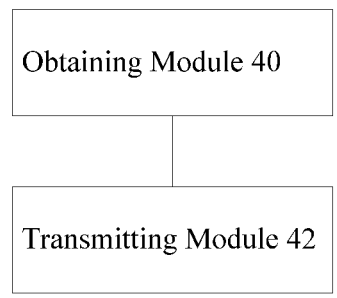
FIG. 4 is a block diagram of another device for determining a transmission parameter of a data shared channel according to an embodiment of the present disclosure.

Hereinafter, according to another aspect of the present disclosure, it further provides an embodiment of a device for determining a transmission parameter of a data shared channel. As illustrated in FIG. 4, the device includes an obtaining module 40 and a transmitting module 42.

The obtaining module 40 is configured to obtain a field for determining a transmission parameter of a data shared channel, the transmission parameter including at least one of a modulation mode, a transmission block size (TBS), a sequence length upon rate matching, a redundancy version and a repetition number; the field includes at least one of a modulation and coding scheme (MCS) indicator field, a TBS indicator field, a resource allocation field and a repetition number indicator field; the MCS indicator field is configured to indicate a modulation and coding scheme; the TBS indicator field is configured to indicate a TBS; the resource allocation field is configured to indicate information of resource allocation of a transmission block (TB) based on a resource unit (RU); the repetition number indicator field is configured to indicate the time of repetitive transmission.

The transmitting module 42 is configured to transmit downlink control information and to determine the transmission parameter according to the field, the downlink control information including a field configured to determine a transmission parameter of a data shared channel.

With this embodiment, by determining a field configured to indicate a transmission parameter of a data shared channel through the second determining module 40 and by transmitting downlink control information through the transmitting module 42, it solves the problem in the related technology that the transmission parameter of the data shared channel in the NB-IOT system cannot be effectively determined. This method effectively improves a performance of HARQ retransmission or repetitive transmission and reduces signaling overheads as far as possible, in the premise of maintaining compatibility.

Optionally, the device may further include a data transmitting module or a data receiving module 44 which is configured to perform a transmitting process or a receiving process of data according to the transmission parameter as determined.

It should be noted that, the above-mentioned, respective modules may be implemented with software or hardware. For the latter, it may be achieved, without limiting, by the following way: all the modules above are located in a single processor; or alternatively, the modules above are located in different processers, respectively.

The present embodiment further provides a system of determining a transmission parameter of a data shared channel. The system is configured to achieve the embodiment(s) and exemplary implementation(s) above, without repeating the contents having been described.

Figure 5:
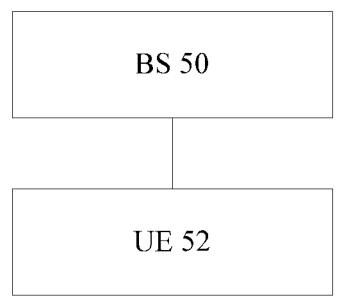
FIG. 5 is a schematic view of a system of determining a transmission parameter of a data shared channel according to an embodiment of the present disclosure.

As illustrated in FIG. 5, the system of determining a transmission parameter of a data shared channel includes a base station (BS) 50 and a user equipment (UE) 52.

The base station 50 is configured to obtain a field for determining a transmission parameter of a data shared channel, to transmit downlink control information, and to determine the transmission parameter according to the field; the downlink control information including a field configured to determine a transmission parameter of a data shared channel; the transmission parameter including at least one of a modulation mode, a transmission block size (TBS), a sequence length upon rate matching, a redundancy version and a repetition number; the field including at least one of a modulation and coding scheme (MCS) indicator field, a TBS indicator field, a resource allocation field and a repetition number indicator field. The MCS indicator field is configured to indicate a modulation and coding scheme; the TBS indicator field is configured to indicate a TBS; the resource allocation field is configured to indicate information of resource allocation of a transmission block (TB) based on a resource unit (RU); and the repetition number indicator field is configured to indicate the time of repetitive transmission.

The user equipment 52 is configured to receive downlink control information and to determine the transmission parameter according the field for determining a transmission parameter of a data shared channel in the downlink control information.

It should be noted that, the system encompasses the following two cases: i) the data transmitting process of the base station is corresponding to the data receiving process of the UE; and ii) the data receiving process of the base station is corresponding to the data transmitting process of the UE.

In this embodiment, by transmitting downlink control information including a field configured to indicate a transmission parameter of a data shared channel through the base station and by receiving the downlink control information and determining the transmission parameter according to the field through the UE 52, it solves the problem in the related technology that the transmission parameter of the data shared channel in the NB-IOT system cannot be effectively determined. This method, by utilizing a manner of joint source-channel coding, may effectively improve a performance of HARQ retransmission or repetitive transmission and reduce signaling overheads as far as possible, in the premise of maintaining compatibility.

The embodiment of the present disclosure further provides a storage medium. Optionally, in the present embodiment, the above-mentioned storage medium may be configured to store program codes for performing the following steps.

In step S1, downlink control information including a field configured to indicate a transmission parameter of a data shared channel is received. The transmission parameter includes at least one of a modulation mode, a transmission block size (TBS), a sequence length upon rate matching, a redundancy version and a repetition number. The field includes at least one of a modulation and coding scheme (MCS) indicator field, a TBS indicator field, a resource allocation field and a repetition number indicator field. The MCS indicator field is configured to indicate a modulation and coding scheme; the TBS indicator field is configured to indicate a TBS; the resource allocation field is configured to indicate information of resource allocation of a transmission block (TB) based on a resource unit (RU); and the repetition number indicator field is configured to indicate the time of repetitive transmission.

In step S2, the transmission parameter is determined according to the field.

Optionally, in the present embodiment, the above-mentioned storage medium may be, but is not limited to, various types of mediums which may be stored with program codes such as a USB flash disk, a read-only memory (ROM), a random access memory (RAM), a mobile hard disk drive (HDD), a magnetic disk and an optical disk.

Optionally, examples in the present embodiment may refer to the preceding embodiment(s) and example(s) described in optional implementation(s), without repeating in the present embodiment.

Obviously, those skilled in the art should be appreciated that, the above-mentioned, respective modules or steps of the present disclosure may be implemented with an universal computing device; these modules or steps may be integrated in a single computing device or distributed over a network consisted by a plurality of computing devices. Optionally, these modules or steps may be implemented with program codes executable by a computing device, so as to be stored on a storage device and executed by the computing device; moreover, in some cases, the illustrated or described steps may be performed in an order different from that described herein, or may be manufactured separately into respective integrated circuit modules, or multiple modules or steps thereof may be manufactured into a single integrated circuit module. In this way, the present disclosure is not limited to any specific combination of hardware and software.

Described above merely are exemplary embodiments of the present disclosure without limiting the present disclosure. For those skilled in the art, various modifications and variants may be made to the present disclosure. Any modification and variant within the spirit and principle of the present disclosure should be fallen into the scope of the present disclosure.

INDUSTRIAL APPLICABILITY

As above, embodiments of the present disclosure provide a method, a device and a system of determining a transmission parameter of a data shared channel, which has the benefits of solving the problem in the related technology that the transmission parameter of the data shared channel in the NB-IOT system cannot be properly determined, effectively improving a performance of HARQ retransmission or repetitive transmission, and reducing signaling overheads as far as possible, in the premise of maintaining compatibility.

What is claimed is:

1. A method of determining a transmission parameter of a data shared channel, comprising:
   receiving downlink control information, the downlink control information comprising a field configured to determine a transmission parameter of a data shared channel, the transmission parameter comprising at least one of a modulation mode, a transmission block size (TBS), a sequence length upon rate matching, a redundancy version and a repetition number, the field comprising at least one of a modulation and coding scheme (MCS) indicator field, a TBS indicator field, a resource allocation field and a repetition number indicator field, the MCS indicator field being configured to indicate a modulation and coding scheme, the TBS indicator field being configured to indicate a TBS, the resource allocation field being configured to indicate information of resource allocation of a transmission block (TB) based on a resource unit (RU), the repetition number indicator field being configured to indicate a number of repetitive transmission; and
   determining the transmission parameter according to the field, wherein in the case where the field comprises the MCS indicator field and the resource allocation field, determining the transmission parameter according to the field comprises:
determining the TBS according to the MCS indicator field and the resource allocation field; and
determining the modulation mode according to the MCS indicator field and the resource allocation field,
wherein determining the modulation mode according to the MCS indicator field and the resource allocation field comprises:
determining the modulation mode according to the MCS indicator field, the resource allocation field, a multi-access mode and a link direction mode between uplink and downlink,
wherein the link direction mode is uplink or downlink, and the multi-access mode is single-tone frequency multiple access, multi-tone frequency multiple access, or OFDMA multiple access.

2. The method according to claim 1, wherein in the case where the field comprises the TBS indicator field and the resource allocation field, determining the transmission parameter according to the field comprises:
determining the modulation mode according to the TBS indicator field and the resource allocation field.

3. The method according to claim 2, wherein determining the modulation mode according to the TBS indicator field and the resource allocation field comprises:
determining the modulation mode according to the TBS indicator field, the resource allocation field, a multi-access mode and a link direction mode between uplink and downlink.

4. The method according to claim 1, wherein in the case where the field comprises the TBS indicator field and the resource allocation field, determining the transmission parameter according to the field comprises:
determining the redundancy version or the repetition number according to the TBS indicator field and the resource allocation field.

5. The method according to claim 1, wherein determining the modulation mode according to the MCS indicator field, the resource allocation field, a multi-access mode and a link direction mode between uplink and downlink comprises:
in the case of uplink, single-tone frequency multiple access, selecting the modulation mode from a third set of modulation mode according to the MCS indicator field and the resource allocation field, wherein the third set of modulation mode comprises: a pi/2 BPSK modulation mode and a pi/4 QPSK modulation mode;
in the case of uplink, multi-tone frequency multiple access, selecting the modulation mode from a fourth set of modulation mode according to the MCS indicator field and the resource allocation field, wherein the fourth set of modulation mode comprises at least one of: a QPSK modulation mode, a TPSK modulation mode and a 8-BPSK modulation mode; and
in the case of downlink, OFDMA multiple access, selecting the modulation mode from a fifth set of modulation mode according to the MCS indicator field and the resource allocation field, wherein the fifth set of modulation mode comprises at least one of: a QPSK modulation mode and a 16QAM modulation mode.

6. The method according to claim 1, wherein in the case where the field comprises the MCS indicator field and the resource allocation field, determining the transmission parameter according to the field comprises:
determining the redundancy version or the repetition number according to at least one of the MCS indicator field and the resource allocation field.

7. The method according to claim 1, wherein determining the transmission parameter according to the field comprises:
determining the TBS according to the field and a preset TBS table.

8. The method according to claim 7, wherein the preset TBS table comprises a one-dimensional table or a two-dimensional table, wherein,
in case that the preset TBS table is a one-dimensional table, a row index or a column index of the one-dimensional table is corresponding to one TBS index, and each TBS is corresponding to one TBS index; and
in case that the preset TBS table is a two-dimensional table, each row of the two-dimensional table is corresponding to one TBS index, each column of the two-dimensional table is corresponding to a number of resource elements, and each TBS is corresponding to one TBS index and a number of resource elements.

9. The method according to claim 7, further comprising:
before determining the TBS according to the field and a preset TBS table, determining the preset TBS table by:
using a first TBS table as the preset TBS table under a first condition, and using a second TBS table as the preset TBS table under a second condition, wherein the first TBS table and the second TBS table are different TBS tables,
wherein the first condition and the second condition comprise at least one of:
the first condition being uplink, single-tone frequency multiple access, while the second condition being uplink, multi-tone frequency multiple access;
the first condition being uplink, single-tone frequency multiple access, while the second condition being downlink, OFDMA multiple access;
the first condition being an in-band operation mode, while the second condition being a stand-alone operation mode or a guard-band operation mode;
the first condition being uplink, multi-tone frequency multiple access, while the second condition being downlink, OFDMA multiple access.

10. The method according to claim 9, wherein the first TBS table and the second TBS table being different TBS tables comprises at least one of the following cases where:
a set of TBS index supported by the first TBS table is the same as a set of TBS index supported by the second TBS table, and a set of RU numbers supported by the first TBS table is different from a set of RU numbers supported by the second TBS table;
a set of TBS index supported by the first TBS table is different from a set of TBS index supported by the second TBS table, and a set of RU numbers supported by the first TBS table is the same as a set of RU numbers supported by the second TBS table;
a set of TBS index supported by the first TBS table is different from a set of TBS index supported by the second TBS table, and a set of RU numbers supported by the first TBS table is also different from a set of RU numbers supported by the second TBS table;
at a same row and column location, all TBS supported by the first TBS table and all TBS supported by the second TBS table satisfy a preset proportional relation;
all TBS supported by the first TBS table is a subset of all TBS supported by the second TBS table.

11. The method according to claim 10, wherein,
   a set of RU numbers supported by the first TBS table being different from a set of RU numbers supported by the second TBS table comprises at least one of the following cases where: a set of RU numbers of the first TBS table is a subset of a set of RU numbers of the second TBS table; and for a same column, an RU numbers of the first TBS table is a multiple of an RU numbers of the second TBS table;
   a set of TBS index supported by the first TBS table being different from a set of TBS index supported by the second TBS table comprises: a set of TBS index supported by the first TBS table being a subset of a set of TBS index supported by the second TBS table; and
   at a same row and column location, a TBS supported by the first TBS table and a TBS supported by the second TBS table satisfying a preset proportional relation comprises: in the case where TBS1(i, j) is not null and TBS2(i, j) is not null, TBS2(i, j)/TBS1(i, j)=a+e, wherein a is a real constant, e is a real number smaller than or equal to a/10, e denotes an error, i indicates a row index, j denotes a column index, TBS1(i, j) denotes a TBS of a $i^{th}$ row and a $j^{th}$ column in the first TBS table, TBS2(i, j) denotes a TBS of a $i^{th}$ row and a $j^{th}$ column in the second TBS table.

12. The method according to claim 1, wherein in the case where the field comprises the resource allocation field and the repetition number indicator field, determining the transmission parameter according to the field comprises:
   determining the sequence length upon rate matching according to the resource allocation field and at least one of the repetition number indicator field and a coverage level mode.

13. The method according to claim 12, wherein determining the sequence length upon rate matching according to the resource allocation field and at least one of the repetition number indicator field and a coverage level mode comprises at least one of the following cases:
   determining the sequence length upon rate matching according to a modulation order, a number of resource elements occupied by one TB and the repetition number Nr; and
   determining the sequence length upon rate matching according to a modulation order, a number of resource elements occupied by one TB and a factor Nr1 of the repetition number, wherein the repetition number Nr=Nr1×Nr2, Nr1 and Nr2 each are an integer greater than or equal to 2.

14. The method according to claim 1, wherein the RU is a time-frequency two-dimensional resource of successive, Nsc subcarrier(s) in the frequency domain and successive, Nsym basic time-domain symbol unit(s) in the time domain, each RU comprises Nsc*Nsym resource element(s), the Nsc and the Nsym each are an integer greater than or equal to 1.

15. The method according to claim 14, wherein in the case where the field comprises the TBS indicator field, determining the transmission parameter according to the field comprises:
   determining the TBS according to the TBS indicator field and the number of the resource elements.

16. A method of determining a transmission parameter of a data shared channel, comprising:
   obtaining a field configured to determine a transmission parameter of a data shared channel, the transmission parameter comprising at least one of a modulation mode, a transmission block size (TBS), a sequence length upon rate matching, a redundancy version and a repetition number, the field comprising at least one of a modulation and coding scheme (MCS) indicator field, a TBS indicator field, a resource allocation field and a repetition number indicator field, the MCS indicator field being configured to indicate a modulation and coding scheme, the TBS indicator field being configured to indicate a TBS, the resource allocation field being configured to indicate information of resource allocation of a transmission block (TB) based on a resource unit (RU), the repetition number indicator field being configured to indicate a number of repetitive transmission; and
   transmitting downlink control information and determining the transmission parameter according to the field, the downlink control information comprising a field configured to determine a transmission parameter of a data shared channel,
   wherein in the case where the field comprises the MCS indicator field and the resource allocation field, determining the transmission parameter according to the field comprises:
   determining the TBS according to the MCS indicator field and the resource allocation field; and
   determining the modulation mode according to the MCS indicator field and the resource allocation field,
   wherein determining the modulation mode according to the MCS indicator field and the resource allocation field comprises:
   determining the modulation mode according to the MCS indicator field, the resource allocation field, a multi-access mode and a link direction mode between uplink and downlink,
   wherein the link direction mode is uplink or downlink, and the multi-access mode is single-tone frequency multiple access, multi-tone frequency multiple access, or OFDMA multiple access.

17. The method according to claim 16, wherein determining the modulation mode according to the MCS indicator field, the resource allocation field, a multi-access mode and a link direction mode between uplink and downlink comprises:
   in the case of uplink, single-tone frequency multiple access, selecting the modulation mode from a third set of modulation mode according to the MCS indicator field and the resource allocation field, wherein the third set of modulation mode comprises: a pi/2 BPSK modulation mode and a pi/4 QPSK modulation mode;
   in the case of uplink, multi-tone frequency multiple access, selecting the modulation mode from a fourth set of modulation mode according to the MCS indicator field and the resource allocation field, wherein the fourth set of modulation mode comprises at least one of: a QPSK modulation mode, a TPSK modulation mode and a 8-BPSK modulation mode; and
   in the case of downlink, OFDMA multiple access, selecting the modulation mode from a fifth set of modulation mode according to the MCS indicator field and the resource allocation field, wherein the fifth set of modulation mode comprises at least one of: a QPSK modulation mode and a 16QAM modulation mode.

18. A device for determining a transmission parameter of a data shared channel which performs the method according to claim 1, comprising:
   a receiving module configured to receive downlink control information, the downlink control information comprising a field configured to determine a transmission parameter of a data shared channel, the transmission parameter comprising at least one of a modulation mode, a transmission block size (TBS), a sequence length upon rate matching, a redundancy version and a repetition number, the field comprising at least one of a modulation and coding scheme (MCS) indicator field, a TBS indicator field, a resource allocation field and a repetition number indicator field, the MCS indicator field being configured to indicate a modulation and coding scheme, the TBS indicator field being configured to indicate a TBS, the resource allocation field being configured to indicate information of resource allocation of a transmission block (TB) based on a resource unit (RU), the repetition number indicator field being configured to indicate a number of repetitive transmission; and a determining module configured to determine the transmission parameter according to the field, wherein in the case where the field comprises the MCS indicator field and the resource allocation field, determining the transmission parameter according to the field comprises:

determining the TBS according to the MCS indicator field and the resource allocation field; and determining the modulation mode according to the MCS indicator field and the resource allocation field, wherein determining the modulation mode according to the MCS indicator field and the resource allocation field comprises:

determining the modulation mode according to the MCS indicator field, the resource allocation field, a multi-access mode and a link direction mode between uplink and downlink, wherein the link direction mode is uplink or downlink, and the multi-access mode is single-tone frequency multiple access, multi-tone frequency multiple access, or OFDMA multiple access.

19. A device for determining a transmission parameter of a data shared channel which performs the method according to claim 16, comprising:

an obtaining module configured to obtain a field configured to determine a transmission parameter of a data shared channel, the transmission parameter comprising at least one of a modulation mode, a transmission block size (TBS), a sequence length upon rate matching, a redundancy version and a repetition number, the field comprising at least one of a modulation and coding scheme (MCS) indicator field, a TBS indicator field, a resource allocation field and a repetition number indicator field, the MCS indicator field being configured to indicate a modulation and coding scheme, the TBS indicator field being configured to indicate a TBS, the resource allocation field being configured to indicate information of resource allocation of a transmission block (TB) based on a resource unit (RU), the repetition number indicator field being configured to indicate a number of repetitive transmission; and a transmitting module configured to transmit downlink control information and to determine the transmission parameter according to the field, the downlink control information comprising a field configured to determine a transmission parameter of a data shared channel, wherein in the case where the field comprises the MCS indicator field and the resource allocation field, determining the transmission parameter according to the field comprises:

determining the TBS according to the MCS indicator field and the resource allocation field; and determining the modulation mode according to the MCS indicator field and the resource allocation field, wherein determining the modulation mode according to the MCS indicator field and the resource allocation field comprises:

determining the modulation mode according to the MCS indicator field, the resource allocation field, a multi-access mode and a link direction mode between uplink and downlink, wherein the link direction mode is uplink or downlink, and the multi-access mode is single-tone frequency multiple access, multi-tone frequency multiple access, or OFDMA multiple access.

20. A system of determining a transmission parameter of a data shared channel, comprising:

a base station configured to obtain a field configured to determine a transmission parameter of a data shared channel, transmit downlink control information, and determine the transmission parameter according to the field, the downlink control information comprising the field configured to determine a transmission parameter of a data shared channel, the transmission parameter comprising at least one of a modulation mode, a transmission block size (TBS), a sequence length upon rate matching, a redundancy version and a repetition number, the field comprising at least one of a modulation and coding scheme (MCS) indicator field, a TBS indicator field, a resource allocation field and a repetition number indicator field, the MCS indicator field being configured to indicate a modulation and coding scheme, the TBS indicator field being configured to indicate a TBS, the resource allocation field being configured to indicate information of resource allocation of a transmission block (TB) based on a resource unit (RU), the repetition number indicator field being configured to indicate a number of repetitive transmission; and a user equipment configured to receive the downlink control information and determine the transmission parameter according the field configured to determine a transmission parameter of a data shared channel in the downlink control information, wherein in the case where the field comprises the MCS indicator field and the resource allocation field, determining the transmission parameter according to the field comprises:

determining the TBS according to the MCS indicator field and the resource allocation field; and determining the modulation mode according to the MCS indicator field and the resource allocation field, wherein determining the modulation mode according to the MCS indicator field and the resource allocation field comprises:

determining the modulation mode according to the MCS indicator field, the resource allocation field, a multi-access mode and a link direction mode between uplink and downlink, wherein the link direction mode is uplink or downlink, and the multi-access mode is single-tone frequency multiple access, multi-tone frequency multiple access, or OFDMA multiple access.

* * * * *